United States Patent
Williams et al.

(10) Patent No.: US 7,287,187 B2
(45) Date of Patent: Oct. 23, 2007

(54) METHOD AND APPARATUS FOR SUPPLYING REDUNDANT POWER

(75) Inventors: Ricki Dee Williams, Temecula, CA (US); Gary L. Gilbert, San Diego, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1086 days.

(21) Appl. No.: 09/977,818

(22) Filed: Oct. 15, 2001

(65) Prior Publication Data
US 2003/0074586 A1    Apr. 17, 2003

(51) Int. Cl.
*G06F 11/00* (2006.01)

(52) U.S. Cl. .................. 714/14; 714/4; 714/22; 714/43; 717/340

(58) Field of Classification Search .................. 714/14, 714/4, 11, 18, 22, 43; 713/300, 324, 340
See application file for complete search history.

(56) References Cited

U.S. PATENT DOCUMENTS

| | | | |
|---|---|---|---|
| 4,607,330 A * | 8/1986 | McMurray et al. | 714/14 |
| 5,361,249 A | 11/1994 | Monastra et al. | |
| 5,649,297 A * | 7/1997 | Park | 370/314 |
| 5,652,893 A * | 7/1997 | Ben-Meir et al. | 713/300 |
| 5,812,882 A * | 9/1998 | Raji et al. | 710/72 |
| 5,917,253 A * | 6/1999 | Rusnack | 713/300 |
| 5,939,799 A * | 8/1999 | Weinstein | 714/14 |
| 6,067,286 A | 5/2000 | Jones et al. | |
| 6,412,079 B1 * | 6/2002 | Edmonds et al. | 714/13 |
| 6,748,429 B1 | 6/2004 | Talluri et al. | |
| 6,757,243 B1 | 6/2004 | Chaudhuri et al. | |
| 2001/0056553 A1 | 12/2001 | Suzuki et al. | |
| 2003/0061476 A1 | 3/2003 | Phelps et al. | |
| 2003/0061534 A1 | 3/2003 | Drogichen et al. | |

FOREIGN PATENT DOCUMENTS

EP        0 543 582        5/1993

OTHER PUBLICATIONS

"Sun Enterprise™ 10000 Server: Dynamic System Domains", Technical White Paper, Sun Microsystems, Inc. Palo Alto, CA, 1999.
European Search Report mailed Mar. 30, 2006 EP 02 25 7075.

* cited by examiner

*Primary Examiner*—Robert Beausoliel
*Assistant Examiner*—Joseph D Manoskey
(74) *Attorney, Agent, or Firm*—Meyertons Hood Kivlin Kowert & Goetzel, P.C.; B. Noël Kivlin (57) ABSTRACT

The present invention provides a method and apparatus for supplying redundant power. The apparatus includes a first power supply adapted to provide a first portion of power. The apparatus further includes a second power supply adapted to provide a second portion of power and a distribution network, wherein the distribution network is adapted to direct the first portion of power and the second portion of power to a first split path adapted to transmit signals in a system.

16 Claims, 8 Drawing Sheets

METHOD AND APPARATUS FOR SUPPLYING REDUNDANT POWER

BACKGROUND OF THE INVENTION

1. Field of the Invention

This invention relates generally to processor-based systems, and, more particularly, to supplying redundant power to components of processor-based systems.

2. Description of the Related Art

Businesses may use processor-based systems to simultaneously perform a wide variety of tasks. These tasks may include, but are not limited to, developing new software, maintaining databases of information related to operations and management, and hosting a web server that may facilitate communications with customers. To handle such a wide range of tasks, businesses may employ a processor-based system in which some or all of the processors may operate in a networked environment.

One example of a processor-based system used in a network-centric environment is a mid-range server system. A single mid-range server system may have a plurality of system boards that may, for example, contain one or more processors and one or more associated memory elements. A mid-range server system may also have a plurality of I/O boards that may support a range of I/O devices such as CD-ROMs, printers, scanners, and the like through one or more I/O cards. For example, one or more I/O boards in the mid-range server system may manage peripheral component interface cards and/or optical cards.

The system boards and I/O boards may communicate through a crossbar switch. For example, in one embodiment, the system boards or I/O boards may be coupled to the crossbar switch, which may comprise at least one application specific integrated circuit (ASIC). The processors on the system boards may access data stored in an associated memory element on a second board by sending a request through the crossbar switch. The requested data may then be sent back through the crossbar switch to the requesting processor.

The ASIC in the crossbar switch may, in one embodiment, be powered by a power supply. However, the power supply may represent a single point-of-failure in the mid-range server system. For example, in the event that the power supply may become unable to supply power within acceptable tolerance levels, the compromised power supply may disrupt the functioning of the crossbar switch. In one embodiment, the disruption may interfere with communication between the system boards and I/O boards. Errors may be introduced into the data flowing through the compromised crossbar switch and the errors may cause the mid-range server system to operate improperly or not at all.

SUMMARY OF THE INVENTION

In one aspect of the instant invention, an apparatus is provided for supplying redundant power. The apparatus includes a first power supply adapted to provide a first portion of power. The apparatus further includes a second power supply adapted to provide a second portion of power and a distribution network, wherein the distribution network is adapted to direct the first portion of power and the second portion of power to a first split path adapted to transmit signals in a system.

In one aspect of the present invention, a method is provided for supplying redundant power. The method includes providing a redundant source of power to a first split path, wherein the first split path is adapted to transmit signals in a system. The method further includes managing the redundant source of power.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
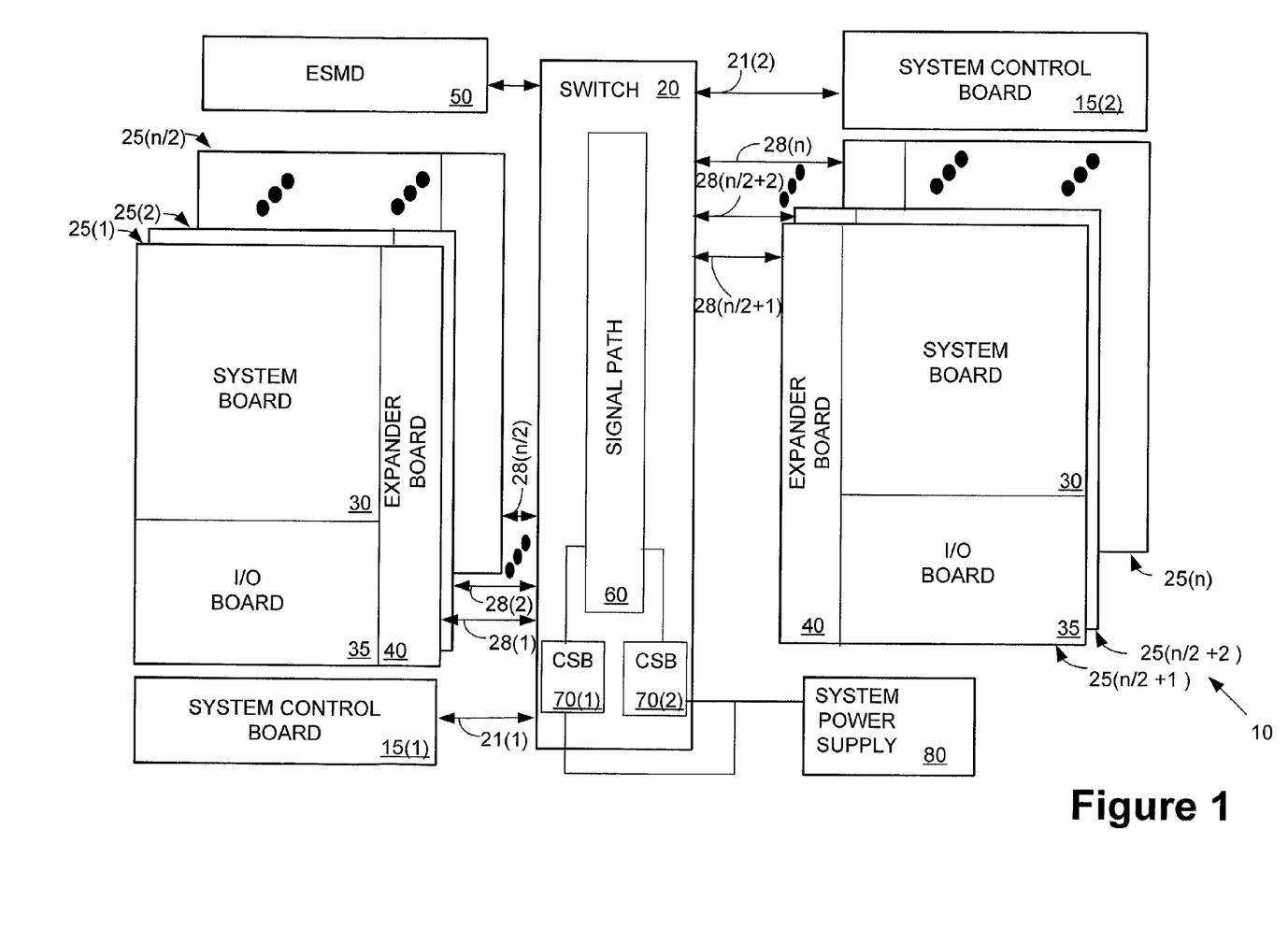
FIG. 1 shows a stylized block diagram of a system in accordance with one embodiment of the present invention.

Referring now to FIG. 1, a block diagram of a system 10 in accordance with one embodiment of the present invention is illustrated. The system 10, in one embodiment, includes a plurality of system control boards 15(1-2) that are coupled to a switch 20. For illustrative purposes, lines 21(1-2) are utilized to show that the system control boards 15(1-2) are coupled to the switch 20, although it should be appreciated that, in other embodiments, the boards 15(1-2) may be coupled to the switch in any of a variety of ways, including by edge connectors, cables, or other available interfaces.

In the illustrated embodiment, the system 10 includes two control boards 15(1-2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate replaceable system control board. In one embodiment, during any given moment, generally one of the two system control boards 15(1-2) actively controls the overall operations of the system 10.

The system 10, in one embodiment, includes a plurality of system board sets 25(1-n) that are coupled to the switch 20, as indicated by lines 28(1-n). The system board sets 25(1-n), in one embodiment, comprise one or more boards, including a system board 30, an I/O board 35, and an expander board 40. The system board 30 may include processors and associated memories for executing, in one embodiment, applications, including portions of an operating system. The I/O board 35 may manage I/O cards, such as peripheral component interface cards and optical cards, which are installed in the system 10. The system board sets 25(1-n) may be coupled to the switch 20 in one of several ways, including edge connectors or other available interfaces.

The expander board 40, in one embodiment, generally acts as a multiplexer (e.g., 2:1 multiplexer) to allow both the system and I/O boards 30, 35 to interface with the switch 20, which, in some instances, may have only one slot for interfacing with both boards 30, 35. In one embodiment, the system board 30 and the I/O 35 board may, separately or in combination with the expander board 40, be removed from the system 10 by decoupling one or more of the boards 30, 35 from their respective interface slots.

An environmental system monitoring demon (ESMD) 50 may be coupled to the switch 20 in one of several ways, including edge connectors or other available interfaces. The ESMD 50 may collect environmental information from one or more components of the switch 20 and may use this information to detect malfunctions of the one or more components in the switch 20. The environmental information collected and/or used by the ESMD 50 may comprise, but is not limited to, temperature, voltages, and currents in components of the switch 20, as well as error messages that may be transmitted by the one or more components of the switch 20.

The switch 20 may serve as a communications conduit for the plurality of system board sets 25(1-n), half of which may be connected on one side of the switch 20 and the other half on the opposite side of the switch 20. The switch 20, in one embodiment, may be a 18×18 crossbar switch that allows system board sets 25(1-n) and system control boards 15(1-2) to communicate, if desired. Thus, the switch 20 may allow the two system control boards 15(1-2) to communicate with each other or with other system board sets 25(1-n), as well as allow the system board sets 25(1-n) to communicate with each other. For example, processors (not shown) in the system board sets 25(1-2) may send requests for data along the switch 20 and the requested data may be returned to the requesting processor along the switch 20. Other forms of information may also be transmitted along the switch 20, including, but not limited to, addresses of memory locations on the system board sets 25(1-2), data from I/O devices on the one or more I/O boards 30, and error messages from malfunctioning components in the system 10.

The switch 20 may, in one embodiment, comprise at least one signal path 60. The signal path 60 may be adapted to transmit signals. Although not so limited, these signals may, in one embodiment, comprise data, response, and address signals that may pass between the system board sets 25(1-n) and the system control boards 15(1-2). The switch 20 may further comprise two centerplane support boards (CSBs) 70(1-2) coupled to the signal path 60. In one embodiment, the CSBs 70(1-2) may be adapted to receive power from one or more system power supplies 80 in the system 10 at a first voltage. Each of the CSBs 70(1-2) may further be adapted to transmit power to the signal path 60 at a second voltage. Although not necessary, the second voltage may be lower than the first voltage. For example, in one embodiment, the one or more system power supplies 80 may provide power at approximately 48 volts. It may, however, be desirable to provide power to the switch 20 at a voltage near 5 volts. It should also be noted that the number and location of the signal paths 60 and the CSBs 70(1-2) are design choices and additional signal paths 60 or CSBs 70(1-2) may, in alternative embodiments, be added in any desirable location in the system 10.

The CSBs 70(1-2) may, in one embodiment, substantially provide power used by the signal path 60. If one or more of the CSBs becomes unable to provide power to the signal path 60 within acceptable tolerance levels, communication along the switch 20 may be compromised. Consequently, it may be desirable for each of the CSBs 70(1-2) to comprise at least two redundant power supplies (not shown) adapted to provide a redundant source of power to the signal path 60. As will be described in more detail below, in accordance with one or more embodiments of the present invention, using one or more CSBs 70(1-2) comprising a redundant source of power may improve the availability of the system 10 by reducing the chance that the failure of one power supply (not shown) on one of the CSBs 70(1-2) may compromise the function of the system 10.

Figure 2:
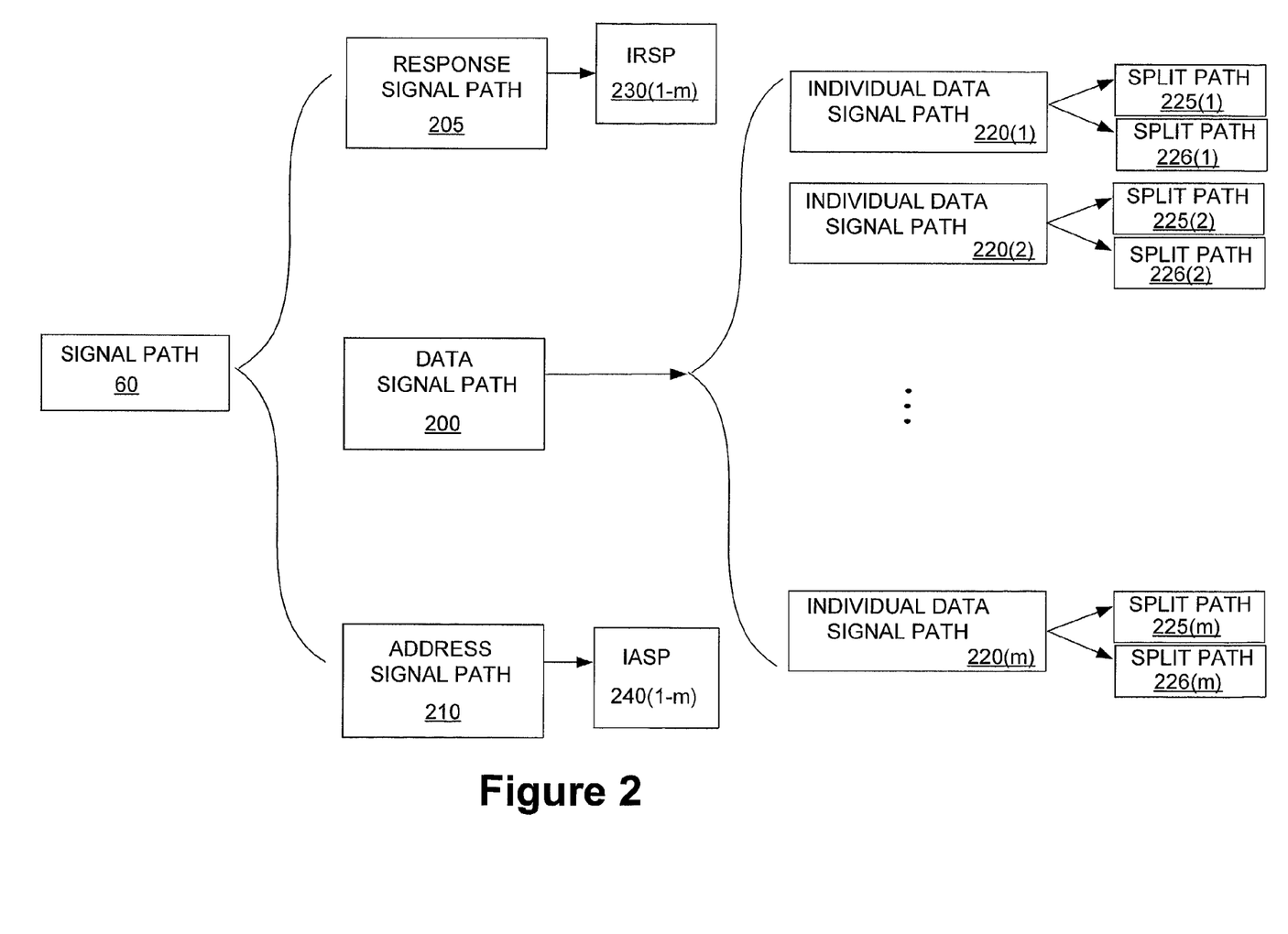
FIG. 2 illustrates a switch that may be used in the system shown in FIG. 1, in accordance with one embodiment of the present invention.

Referring now to FIG. 2, one embodiment of a division of the signal path 60 into collections of sub-paths that may transmit a variety of forms of information is shown. In one embodiment, the signal path 60 may comprise a data signal path 200, a response signal path 205, and an address signal path 210. The data signal path 100 may transmit data along the signal path 60 of the switch 20; the response signal path 205 may transmit control signals along the signal path 60 of the switch 20; and the address signal path may transmit address requests along the signal path 60 of the switch 20. The data, address, and response signal paths 200, 205, 210 may, in one embodiment, further comprise collections of one or more individual signal paths that may be one or more bits wide. For example, in one embodiment, the data signal path 200 may comprise m individual data signal paths 220(1-m) that may be 288 bits wide.

The number and type of individual signal paths 220(1-m), 230(1-m), 240(1-m) are implementation specific. In one embodiment, there may be three separate kinds of signal paths, i.e., data, address and response. There may be at least one individual signal path 220(1-m) of each kind between each expander board 40 of each system board set 25(1-m). Thus, there may be at least m=3×n×n individual signal paths in the illustrated embodiment. In one implementation, n=18, yielding a total of at least m=972 individual signal paths. However, the number may vary depending on the number of kinds of signal paths and the number of expansion boards 40.

In one embodiment, the individual signal paths 220(1-m), 230(1-m), 240(1-m) may further comprise at least two split paths. For example, in one embodiment, the individual data signal paths 220(1-m) may be divided into a split path 225(1-m) and a split path 226(1-m). When the system 10 operates in a "normal" mode, transactions such as passing data, responses, or addresses from one system board 30 to a second system board 30 may be conducted by transmitting messages along individual signal paths. For example, in one embodiment, data may be transmitted along an individual data signal path **220(1-*m*). Before it is transmitted, however, the information for any given transaction may be separated into a first portion and a second portion, each packaged with a common header (not shown) in a respective message (not shown). The first portion may then be transmitted over a split path 225(1-*m*) and the second portion may be transmitted in parallel with the first portion over a split path 226(1-*m*) of the individual data signal path 220(1-*m*)**.

In one embodiment, the individual signal paths **220(1-*m*), 230(1-*m*), 240(1-*m*) may also function in a "degraded" mode, in which the two portions may be transmitted along a single split path 225(1-*m*), 226(1-*m*) of the individual signal paths 220(1-*m*), 230(1-*m*), 240(1-*m*). In the event that one of the split paths 225(1-*m*), 226(1-*m*) of the individual signal paths 220(1-*m*), 230(1-*m*), 240(1-*m*) may become compromised and unable to perform at least a portion of its function, the system 10 may enter the degraded mode. For example, in one embodiment, the split path 225(1) of the individual data signal path 220(1) may become unable to transmit data. The system 10 may then enter the degraded mode and transmit the two portions of the data messages along the functioning split path 225(2) of the individual data signal path 220(1). Although the system 10 may continue to function in degraded mode, transmitting the two portions of the messages along a single split path 225(1-*m*), 226(1-*m*) may take approximately twice as many clock cycles. Therefore, it may be desirable to provide additional redundant features that may reduce the chance that a single failure may cause the system 10** to enter the degraded mode.

Figure 3A:
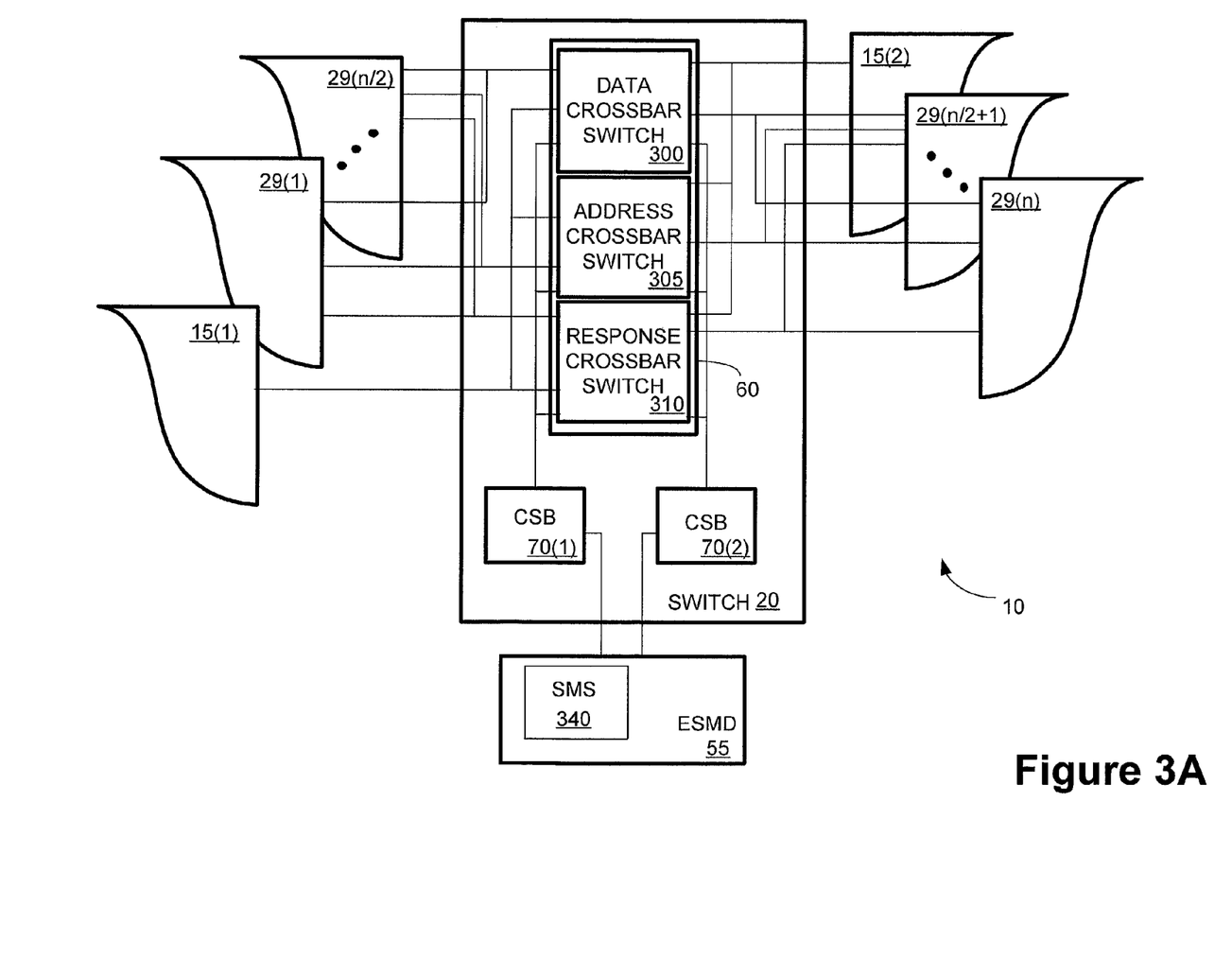
FIGS. 3A-3C show a crossbar switch that may be used in the switch illustrated in FIG. 2, in accordance with one embodiment of the present invention.

Referring now to FIG. 3A, a stylized diagram showing components of one embodiment of the switch 20 in the system 10 is presented. The switch 20 may comprise a signal path 60 and one or more CSBs 70(1-2). The signal path may further comprise a data crossbar switch 300, an address crossbar switch 305, and a response crossbar switch 310 for transmitting respective data, response, and address signals among the system board sets **25(1-*n*) and system control boards 15(1-2). In one embodiment, the crossbar switches 300, 305, 310 may be configured to carry data, responses, and address requests along the data, response, and address paths 200, 205, 210 of the signal path 60**.

Figure 3B:
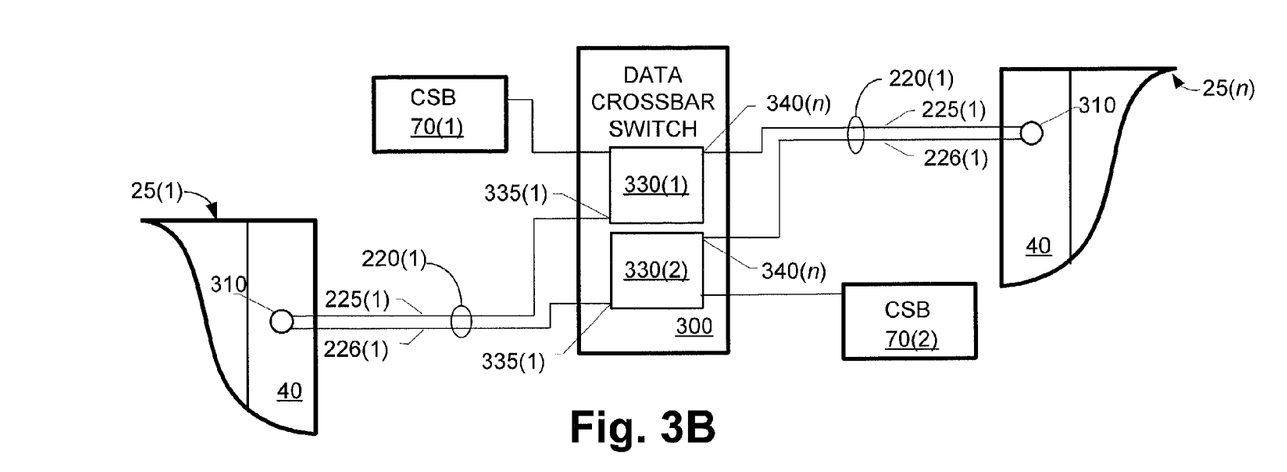

To illustrate how the individual signal paths **220(1-*m*), 230(1-*m*), 240(1-*m*) may be separated into split paths (e.g. 225(1-*m*), 226(1-*m*)) passing through the crossbar switches 300, 305, 310, consider an individual data signal path 220(1), shown in FIG. 3B. In one embodiment, the individual data signal path 220(1) may pass through a switch 310 on a first expansion board 40 of the system board set 25(1) and the switch 310 on a second expansion board 40 of the system board 25(*n*). Address and response signal paths 230(1-*m*), 240(1-*m*) may be structured similarly except for obvious changes, e.g., the address crossbar switch 305 is used instead of the data crossbar switch 300**.

Figure 3C:
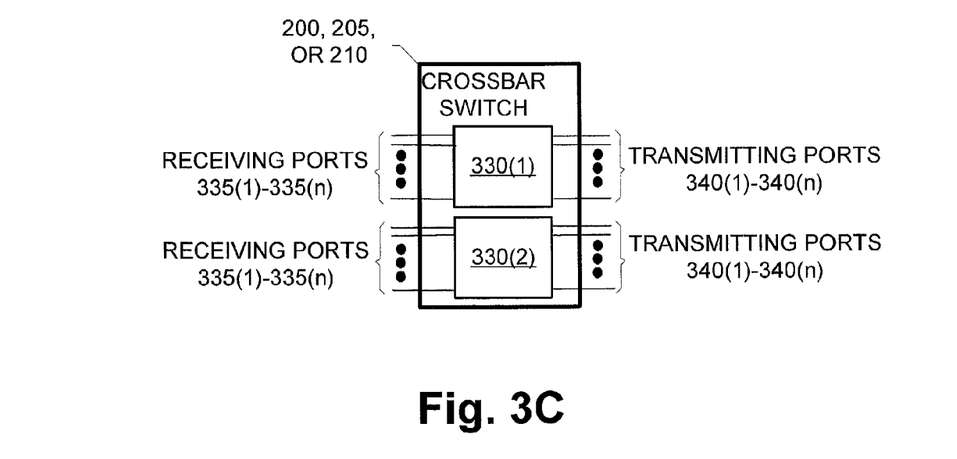

Turning now to FIG. 3C, each crossbar switch 300, 305, 310, may, in one embodiment, comprise two halves 330(1-2). In one embodiment, each half 330(1-2) may be implemented by one or more ASICs (not shown) and may have n receiving ports **335(1-*n*) and n transmitting ports 340(1-*n*), where n is the number of expansion boards 40 in the system 10. Thus, if there are 18 expansion boards 40, each half 330(1-2) would include 18 receiving ports 335 and 18 transmitting ports 340. In one embodiment, each of the ports 335(1-*n*), 340(1-*n*) may be adapted to couple one half 330(1-2) to split paths 225(1-*m*), 226(1-*m*) of the individual signal paths 220(1-*m*), 230(1-*m*), 240(1-*m*) and thus may comprise a width that is half as many bits wide as the individual signal paths 220(1-*m*), 230(1-*m*), 240(1-*m*)**.

Referring back to FIG. 3B, when the system 10 operates in a normal mode, a given transaction may be separated into two portions at the switch 310, and each may be packaged with a common header (not shown) in a respective message (not shown). For example, in one embodiment, each message containing a portion of a data transaction may be transmitted over a respective split path 225(1), 226(1) of the individual data signal path 220(1) (including a respective half 330(1), 330(2) of the data crossbar switch 300) from one switch 310 to the other switch 310.

Each of the one or more CSBs 70(1-2) may, in one embodiment, be coupled to one of the halves 330(1-2) of the crossbar switches 300, 305, 310. For example, in one embodiment, the CSB 70(1) is coupled to the half 330(1) and the CSB 70(2) is coupled to the half 330(2). Thus, in one embodiment, the CSB 70(1) may be coupled to the split path 225(1) of the individual data signal path 220(1) and the CSB 70(2) may be coupled to the split path 226(1) of the individual data signal path 220(1).

The CSBs 70(1-2) may comprise one or more ASICs adapted to serve a variety of functions. These functions may include, but are not limited to, providing one or more clock signals to the halves 330(1-2) of the crossbar switches 300, 305, 310. For example, in one embodiment, the CSB 70(1) may provide a 150 MHz system clock and a 75 MHz phase clock to the half 330(1) of the data crossbar switch 300. The CSBs 70(1-2) may also be adapted to substantially provide power to the halves 330(1-2) of the crossbar switches 300, 305, 310. Consequently, the function of a split path **225(1-*m*), 226(1-*m*) may be compromised by a malfunction in one of the CSBs 70(1-2). For example, if one of the CSBs 70(1-2) should become unable to supply power to the half 330(1) of the data crossbar switch 300 within acceptable tolerance levels, the half 330(1) may not be able to substantially perform its functions and data transactions that may be transmitted along the split path 225(1)** may be disrupted.

Now referring back to FIG. 3A, the one or more CSBs 70(1-2) may, in one embodiment, be coupled to the ESMD 50, which may run a system monitoring software (SMS) package 340. In one embodiment, the ESMD 50 may be coupled to the one or more CSBs 70(1-2) and may collect environmental information from the one or more CSBs 70(1-2). The environmental information may comprise, but is not limited to, temperature, voltages, and currents, as well as error messages that may be transmitted by the one or more CSBs 70(1-2).

Although not so limited, the SMS package 340 may use the environmental information collected by the ESMD 50 to determine when the one or more CSBs 70(1-2) may be malfunctioning. In one embodiment, at such a time as the SMS package 340 may determine that the one or more CSBs 70(1-2) may be malfunctioning, the SMS package 340 may send a message to the system control boards 15(1-2) to recommend actions to the system control boards 15(1-2). For example, in one embodiment, the CSBs 70(1-2) may supply power to the crossbar switches 300, 305, 310. If the SMS package 340 detects a failure in a power distribution network (not shown) on the one or more CSBs 70(1-2), the SMS package 340 may instruct the system control boards 15(1-2) to cause the system 10 to enter the degraded mode. However, the system 10 may not function as efficiently in degraded mode and so it may be desirable to provide redundant components to reduce the chance that the system 10 may have to operate in the degraded mode.

Figure 4A:
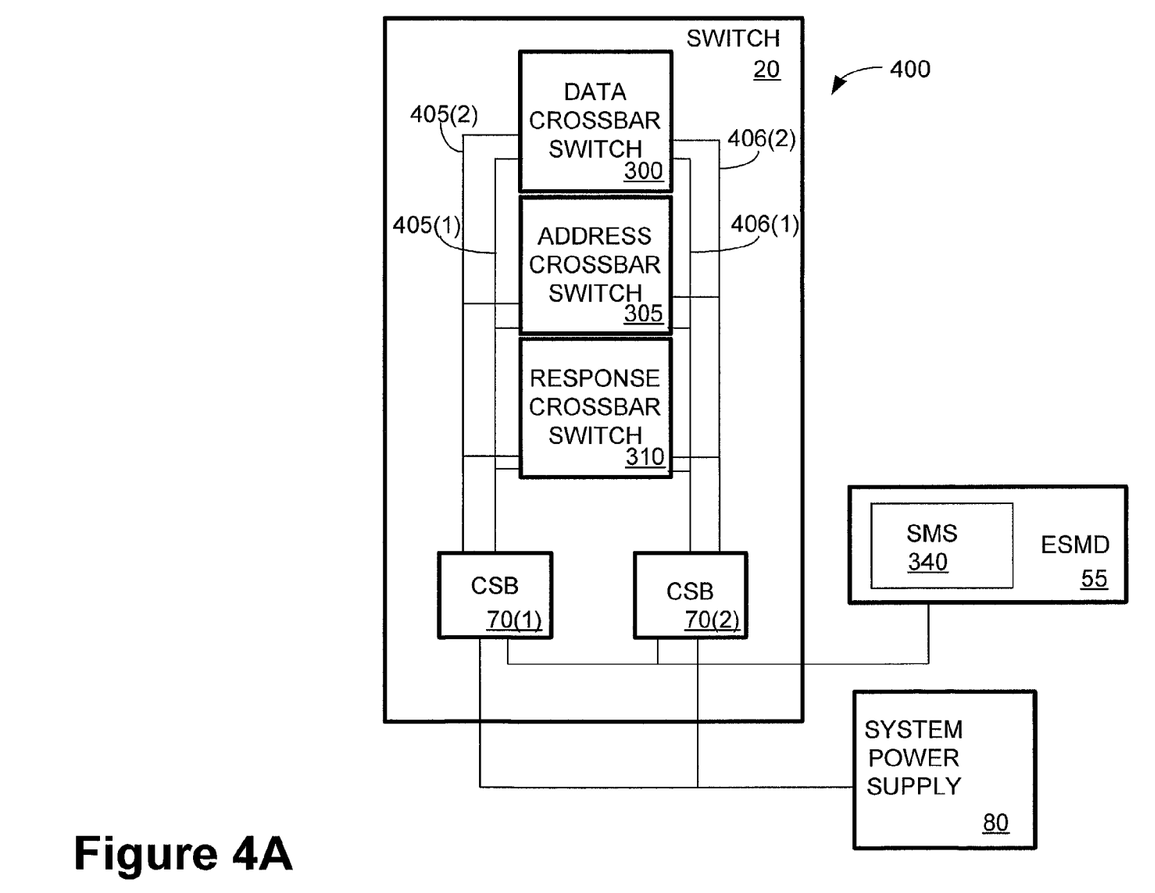
FIGS. 4A-4C show a stylized block diagram of a power distribution network that may be used in the system illustrated in FIG. 1, in accordance with one embodiment of the present invention.

Referring now to FIG. 4A, a stylized diagram illustrating one embodiment of a power distribution network 400 that may be used by the switch 20 in the system 10 is shown. The system power supply 80 may be coupled to one or more CSB 70(1-2) and may supply power to the one or more CSBs 70(1-2) at a first voltage. For example, in one embodiment, the system power supply 80 may supply power at approximately 48 volts. The one or more CSBs 70(1-2) may be coupled to the data crossbar switch 300, the address crossbar switch 305, and the response crossbar switch 310 and may provide power at a second voltage to the crossbar switches 300, 305, 310 through two or more lines 405(1-2), 406(1-2). For example, in one embodiment, it may be desirable to provide power to the crossbar switches 300, 305, 310 through the two or more lines 405(1-2), 406(1-2) at a voltage near 5 volts, although it should be noted that, in alternative embodiments, any appropriate voltages may be chosen by those skilled in the art having benefit of the present disclosure.

Figure 4B:
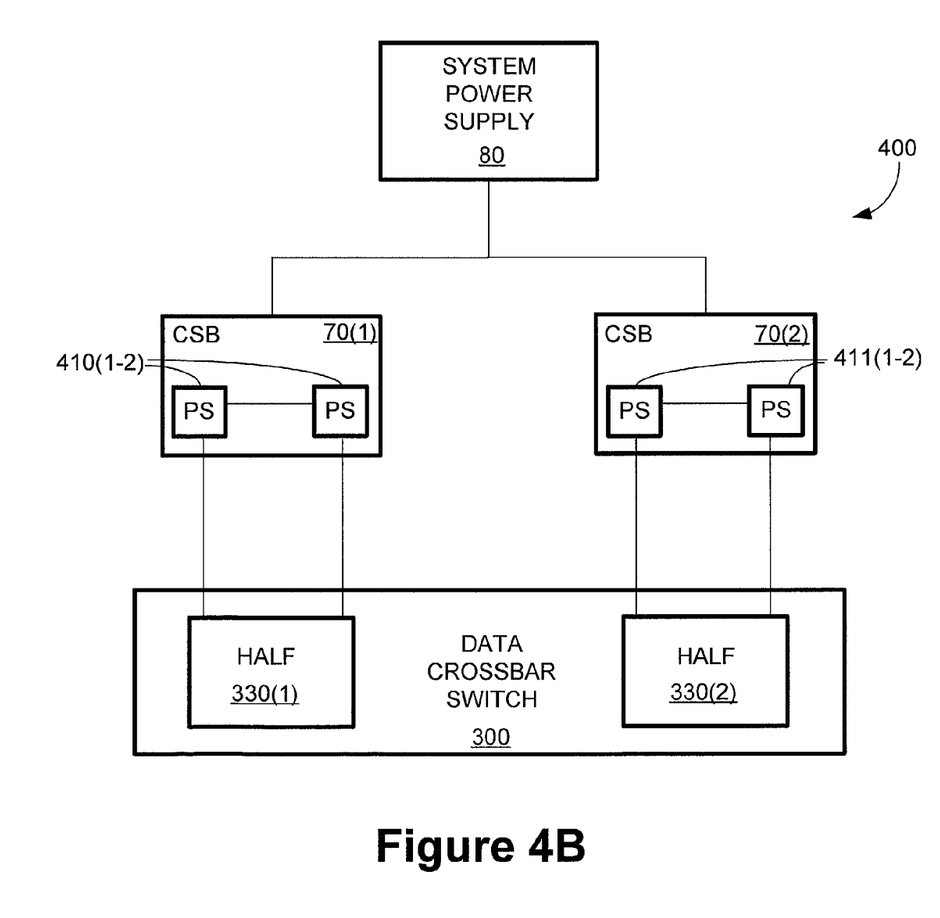

Turning to FIG. 4B, one embodiment of a portion of the power distribution network 400 is shown. The system power supply 80 may provide power to the one or more CSBs 70(1-2), which may provide power to the halves 330(1-2) of the crossbar switches 300, 305, 310 through at least two redundant power supplies (PS) 410(1-2). For example, in one embodiment, the redundant power supplies 410(1-2) on the CSB 70(1) may be coupled to the half 330(1) of the data crossbar switch 300 and the redundant power supplies 411(1-2) on the CSB 70(2) may be coupled to the half 330(2) of the data crossbar switch 300. A similar architecture may be used to couple the address and response crossbar switches 305, 310 to the power distribution network 400.

Figure 4C:
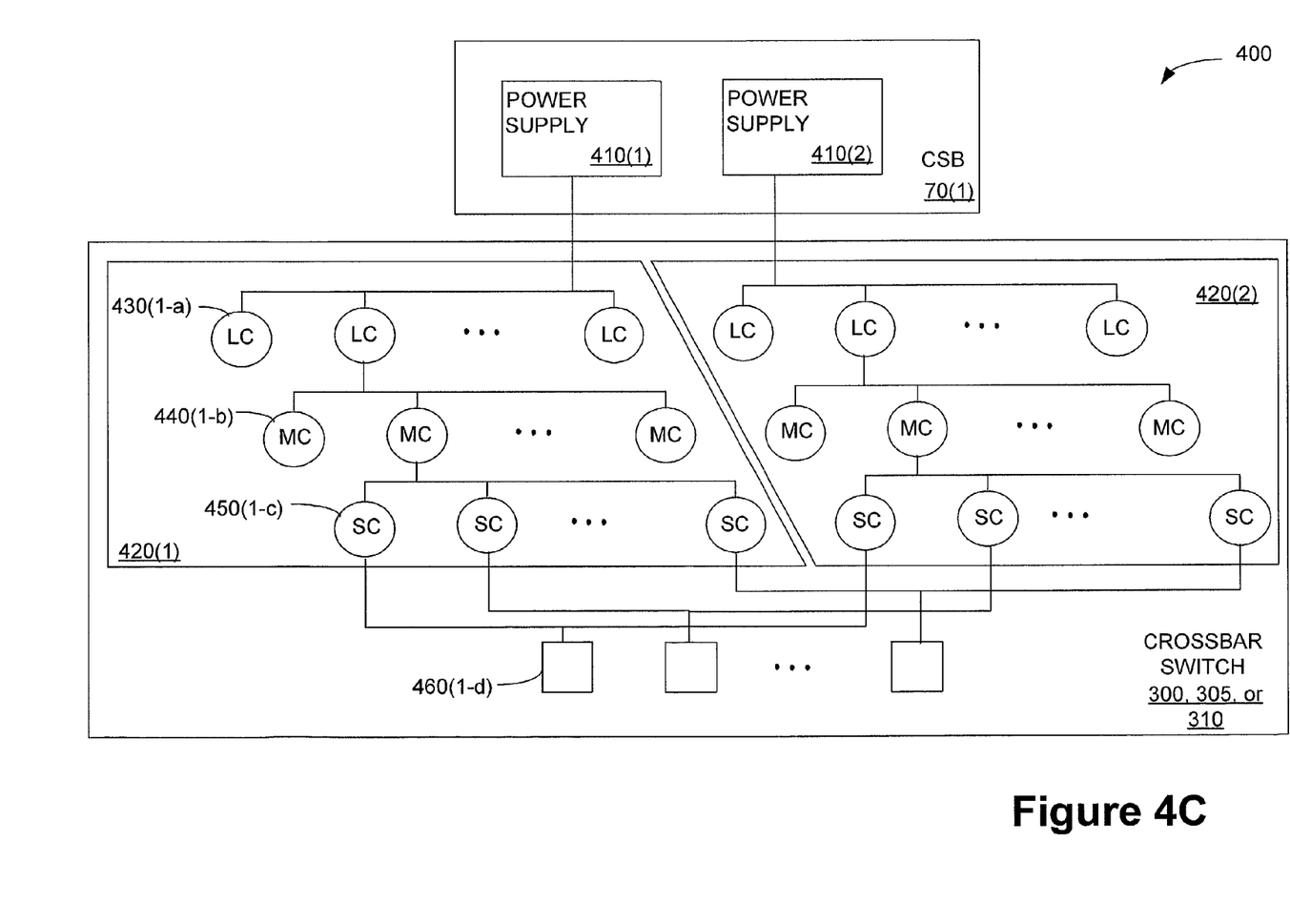

FIG. 4C shows a more detailed view of the power distribution network 400 in a crossbar switch 300, 305, 310. In one embodiment, the redundant power supplies 410(1-2) on the CSB 70(1) may be coupled to one or more capacitor networks 420(1-2). The one or more capacitor networks 420(1-2) may comprise a layer of large capacitors (LC) 430(1-a) coupled to a layer of midsize capacitors (MC) 440(1-a), which may be coupled to a layer of small capacitors (SC) 450(1-c). The small capacitors 450(1-c) may, in one embodiment, be coupled to the one or more ASICs 460(1-d) that may perform the functions of the crossbar switch 300, 205, or 210. The precise numbers of large capacitors 430(1-a), mid-size capacitors 440(1-b), small capacitors 450(1-c), and ASICs 460(1-d) in the one or more capacitor networks 420(1-2) in the crossbar switches 300, 305, 310 are not material to this invention and any appropriate number of capacitors and ASICs may be used, as will be appreciated by those skilled in the art having benefit of the present disclosure. It should also be noted that the number of layers of capacitors in the one or more capacitor networks 420(1-2) is a matter of design choice and may vary in alternative embodiments of the present invention.

In one embodiment, it may be desirable to rapidly supply relatively small amounts of power to the ASICs 460(1-d). For example, the states of the ASICs 460(1-d) in the crossbar switches 300, 305, 310 may refresh once per clock cycle, which may be as short as a few nanoseconds. The redundant power supplies 410(1-2) may not be capable of responding to rapid requests for power from the ASICs 460(1-d). Thus, in one embodiment, the large, mid-size, and small capacitors 430(1-a), 440(1-b), 450(1-c) in the one or more capacitor networks 420(1-2) may provide progressively smaller reservoirs of power that may respond to progressively more rapid requests for power.

In one embodiment, the redundant power supplies 410(1-2) may be coupled to one or more redundant capacitor networks 420(1-2). The redundant capacitor networks 420(1-2) may both provide power to the ASICs 460(1-d). For example, in one embodiment, the power distribution network 400 may use a current sharing design that may allow the ASICs 460(1-d) to draw a first portion of their power from a first capacitor network 420(1) and a second portion of power from a second capacitor network 420(2). It should, however, be appreciated that any suitable means of coupling the first and second capacitor network 420(1-2) to the ASICs 460(1-d) may be used. For example, in one alternative embodiment, a switch (not shown) may be used to couple the first and second capacitor networks 420(1-2) to the ASICs 460(1-d).

In the event that one of the redundant power supplies 410(1) becomes unable to supply power to the redundant capacitor networks 420(1), and consequently becomes unable to supply power to the ASICs 460(1-d), a soft failover may occur in which the ASICs 460(1-d) may draw substantially all of their power from the remaining redundant power supply 410(2) and redundant capacitor network 420(2). A soft failover may, in one embodiment, occur substantially without intervention from the system 10. Thus, providing a redundant source of power may improve the availability of the system 10 by reducing the chance that the failure of one of the one or more redundant power supplies 410(1-2) on the one or more CSBs 70(1-2) may compromise the function of the system 10. However, it should be noted that in alternative embodiments, other methods of distributing power to the ASICs, known to those skilled in the art and having benefit of the present disclosure, may be used.

Referring back to FIG. 4A, the redundant power supplies 410(1-2), 411(1-2) may, in one embodiment, be coupled to the ESMD 50, which may monitor environmental variables to determine whether or not the redundant power supplies 410(1-2), 411(1-2) are delivering power within acceptable tolerance levels. The SMS package 340 being run by the ESMD 50 may use said environmental information to determine if the redundant power supplies 410(1-2), 411(1-2) are functioning substantially within acceptable tolerance levels. If the SMS package 340 detects a malfunction in one or more of the redundant power supplies 410(1-2), 411(1-2), the SMS package 340 may respond in one of a variety of ways.

Figure 5:
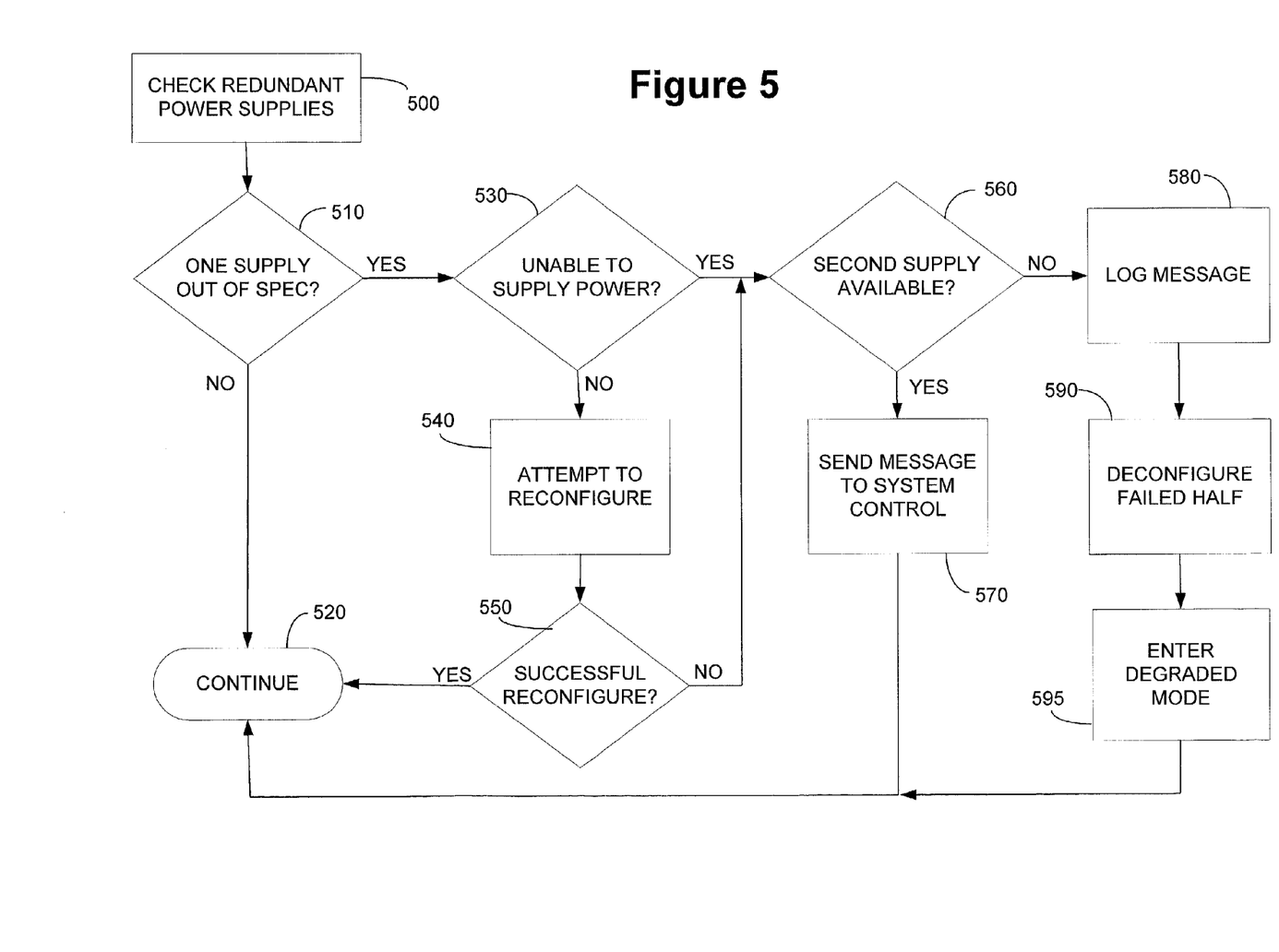
FIG. 5 shows a flow chart that illustrates a method of supplying redundant power in the power distribution network of FIG. 4, in accordance with one embodiment of the present invention.

FIG. 5 shows a flow chart that illustrates a method of supplying redundant power to the switch 20 in the system 10. In one embodiment, the ESMD 50 may collect (at 500) environmental information from redundant power supplies 410(1-2), 411(1-2) on the CSBs 70(1-2). The SMS package 340 may use this information to determine (at 510) if one or more of the redundant power supplies 410(1-2), 411(1-2) may be out of specified tolerance levels and consequently unable to provide power to one or more halves 330(1-2) of one or more of the crossbar switches 300, 305, 310. If, after checking the environmental variables of the redundant power supplies 410(1-2), 411(1-2), the SMS 340 determines (at 510) that the redundant power supplies 410(1-2), 411(1-2) are providing power to the halves 330(1-2) of the crossbar switches 300, 305, 310 within acceptable tolerance levels, then the SMS package 340 may, in one embodiment, instruct the system 10 to continue (at 520) with normal operation.

The SMS 340 may, however, determine (at 510) that at least one of the redundant power supplies 410(1-2), 411(1-2) is operating outside of a specified range of acceptable tolerance levels. Hereinafter, a redundant power supply 410(1-2), 411(1-2) operating outside of a specified range of acceptable tolerance levels will be referred to as an "out-of-spec" redundant power supply 410(1-2), 411(1-2). For example, in one embodiment, it may be desirable to provide power to a half 330(1) of the data crossbar switch 300 at a voltage that is approximately within 0.5 volts of a value of 5 volts. In this example, the SMS 340 may determine (at 510) that an out-of-spec redundant power supply 410(1) may be providing power at approximately 4 volts, which the SMS 340 may determine (at 510) to be outside the specified range acceptable tolerance levels.

The SMS 340 may further determine (at 530) whether or not the out-of-spec redundant power supply 410(1) may be substantially unable to provide power to the half 330(1) of the data crossbar switch 300. For example, in one embodiment, an out-of-spec redundant power supply 410(1) may be providing power at 4 volts instead of a voltage of 5 volts. In this example, the out-of-spec redundant power supply 410(1) may be capable of supplying power at the voltage of 5 volts, if properly reconfigured.

If the SMS 340 determines (at 530) that the out-of-spec redundant power supply 410(1) may be able to provide power, the SMS 340 may instruct the system 10 to attempt (at 540) to reconfigure the out-of-spec redundant power supply 410(1). Attempting (at 540) to reconfigure the out-of-spec redundant power supply 410(1) may comprise, but is not limited to, such actions as turning off the out-of-spec redundant power supply 410(1) for a selected duration. The SMS 340 may then, in one embodiment, determine (at 550) whether or not the reconfiguration was successful and the out-of-spec redundant power supply 410(1) may be substantially able to supply power to the half 330(1) of the data crossbar switch 300. If the SMS 340 determines (at 550) that the reconfiguration was substantially successful, the SMS 340 may instruct (at 520) the system 10 to continue with normal operations.

However, in one embodiment, the SMS 340 may determine (at 530) that the out-of-spec redundant power supply 410(1) may be substantially unable to provide power to the half 330(1) of the data crossbar switch 300. This condition may occur, for example, if the SMS 340 determines (at 530) that the out-of-spec redundant power supply is substantially unable to provide power or if the SMS 340 determines (at 550) that the attempt (at 540) to reconfigure the out-of-spec redundant power supply 410(1) failed to substantially enable the out-of-spec redundant power supply 410(1) to provide power within acceptable tolerance levels. In that event, the SMS 340 may determine (at 560) whether or not a second redundant power supply 410(2) may be able to provide power to the half 330(1) of the data crossbar switch 300.

If the SMS 340 determines (at 560) that the second redundant power supply 410(2) may be able to substantially provide power to the half 330(1). Since the failure of the out-of-spec redundant power supply 410(1) may not substantially comprise the operation of the system 10, the SMS 340 may then send (at 570) a message to the system 10 to alert it to the failure of the out-of-spec redundant power supply and continue (at 520) with normal operations. However, if the SMS 340 determines (at 560) that the second redundant power supply 410(2) may also be unable to provide power to the half 330(1) within acceptable tolerance levels, the SMS 340 may determine (at 560) that the half 330(1) may fail. In that event, the SMS 340 may first log (at 580) a message that notifies the system administrator that the redundant power supplies 410(1-2) may be substantially unable to provide power to the half 330(1). The SMS 340 may then instruct the system 10 to deconfigure (at 590) the half 330(1) and enter (at 595) the degraded mode, wherein transactions may pass through the half 330(2). Once the system 10 has substantially entered (at 595) the degraded mode, the SMS 340 may instruct the system 10 to continue (at 520) operation.

Although in the preceding discussion of FIG. 5, specific reference was made to the out-of-spec redundant power supply 410(1), the second redundant power supply 410(2), and the halves 330(1-2) of the data crossbar switch 300, it should be appreciated that a similar method may be applied generally to redundant power supplies 410(1-2), 411(1-2) that may substantially provide power to crossbar switches 300, 305, 310.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a first redundant source of power adapted to provide power to a first split path; and
   a second redundant source of power adapted to provide power to a second split path, wherein the first and second split paths are adapted to convey signals corresponding to a first portion and a second portion of a message, respectively in parallel from a source to a destination.

2. The apparatus of claim 1, wherein the first redundant source of power comprises a first and a second power supply adapted to provide a first and a second portion of power to the first split path.

3. The apparatus of claim 1, wherein the second redundant source of power comprises a third and a fourth power supply adapted to provide a third and a fourth portion of power to the second split path.

4. The apparatus of claim 1, further comprising an environmental system monitoring demon (ESMD) adapted to detect malfunctions in at least one of the first, the second, the third and the fourth power supplies.

5. The apparatus of claim 4, wherein the ESMD is adapted to instruct the system control unit to transmit messages along the second split path if the first split path becomes substantially unable to transmit messages because the first and second power supplies become substantially unable to provide power to the first split path.

6. The apparatus of claim 5, wherein the ESMD is adapted to instruct the system control unit to transmit messages along the first split path if the second split path becomes substantially unable to transmit messages because the third and fourth power supplies become substantially unable to provide power to the second split path.

7. The apparatus as recited in claim 1, further comprising a power distribution network including first capacitor network comprising at least one capacitor coupled to the first split path and adapted to store the portion of power provided by the first power supply for a selected duration.

8. The apparatus of claim 7, wherein the power distribution network comprises a second capacitor network comprising at least one capacitor coupled to the first split path and adapted to store the portion of power provided by the second power supply for a selected duration.

9. The apparatus of claim 8, wherein the first capacitor network and the second capacitor network are coupled in a current sharing design to substantially provide redundant power to the first split path, reducing the chance that a malfunction in one power supply will introduce errors into signals transmitted along the first split path and compromise the function of the system.

10. The apparatus of claim 8, wherein the first capacitor network and the second capacitor network are coupled at a switch that substantially provides redundant power to the first split path, reducing the chance that a malfunction in one power supply will introduce errors into signals transmitted along the first split path and compromise the function of the system.

11. A method, comprising:
providing a first redundant source of power to a first split path;
providing a second redundant source of power to a second split path, wherein the first and the second split paths are adapted to convey signals corresponding to a first portion and a second portion of a message, respectively, in parallel from a source to a destination; and
managing the first and the second redundant sources of power.

12. The method of claim 11, wherein providing a first redundant source of power comprises providing a first and a second portion of power from a first and a second power supply coupled to the first split path.

13. The method of claim 11, wherein providing a second redundant source of power comprises providing a third and a fourth portion of power from a third and a fourth power supply coupled to the second split path.

14. The method of claim 11, wherein managing the first and second redundant power supplies comprises determining if the first, second, third, and fourth power supplies are malfunctioning.

15. The method of claim 14, wherein managing further comprises instructing the system to transmit messages along the first split path if the second split path becomes substantially unable to transmit messages because the third and the fourth power supplies become substantially unable to provide power to the second split path.

16. The method of claim 15, wherein taking an action further comprises instructing the system to transmit messages along the second split path if the first split path becomes substantially unable to transmit messages because the first and second power supplies become substantially unable to provide power to the first split path.

* * * * *